(12) United States Patent
Heier et al.

(10) Patent No.: US 7,291,094 B2
(45) Date of Patent: Nov. 6, 2007

(54) DRIVING SYSTEM FOR OFF-ROAD UTILITY VEHICLE

(75) Inventors: Wolfgang Heier, Sessenheim (FR); Baptist Zepf, Gaggennau (DE)

(73) Assignee: DaimlerChrysler AG, Stuttgart (DE)

( * ) Notice: Subject to any disclaimer, the term of this patent is extended or adjusted under 35 U.S.C. 154(b) by 203 days.

(21) Appl. No.: 10/533,357

(22) PCT Filed: Oct. 1, 2003

(86) PCT No.: PCT/EP03/10895

§ 371 (c)(1),
(2), (4) Date: Dec. 2, 2005

(87) PCT Pub. No.: WO2004/039620

PCT Pub. Date: May 13, 2004

(65) Prior Publication Data

US 2006/0122032 A1   Jun. 8, 2006

(30) Foreign Application Priority Data

Oct. 31, 2002 (DE) ................. 102 50 734

(51) Int. Cl.
*B60W 10/02* (2006.01)
(52) U.S. Cl. ........................................ 477/174
(58) Field of Classification Search ........... 180/247; 477/166, 174
See application file for complete search history.

(56) References Cited

U.S. PATENT DOCUMENTS

| 4,552,036 A | 11/1985 | Takano et al. |
| 6,347,271 B1 | 2/2002 | Showalter |

FOREIGN PATENT DOCUMENTS

| DE | 38 38 709 A1 | 6/1989 |
| DE | 30 34 229 A1 | 4/1991 |
| DE | 42 30 326 A1 | 3/1993 |
| DE | 43 27 507 C2 | 7/1996 |
| EP | 0 076 148 B1 | 4/1983 |
| EP | 0 432 549 A1 | 6/1991 |

*Primary Examiner*—Dirk Wright
(74) *Attorney, Agent, or Firm*—Crowell & Moring LLP

(57) ABSTRACT

A drive system for a utility vehicle has at least one rear axle, which can be permanently driven from a drive engine via a speed-change gearbox, and a front axle which is operatively connected to the rear axle by an axle engagement clutch that can generally be controlled manually for engagement and disengagement. In order to avoid the risk of the driver's failing to recognize the need for engagement of the axle engagement clutch in the case of difficult traction of the utility vehicle on an adherent roadway and of the rear axle being overloaded as a result, provision is made for the engagement of the axle engagement clutch to be initiated automatically as a function of the engine load.

7 Claims, 2 Drawing Sheets

DRIVING SYSTEM FOR OFF-ROAD UTILITY VEHICLE

This application claims the priority of German patent application 102 50 734.1, filed Oct. 31, 2002 (PCT International Application No. PCT/EP2003/010895, filed Oct. 1, 2003), the disclosure of which is expressly incorporated by reference herein.

The invention relates to a drive system for an off-road utility vehicle.

Drive systems are known (in particular from applicants' series-produced UNIMOG utility), in which a drive engine, via an external clutch, drives a main speed-change gearbox which has a plurality of gears (specifically, four), and to which a two-stage range group in the form of an epicyclic set is assigned in series in the power flow. A drive path leads from the main speed-change gearbox to a transfer gearbox which has front and rear axle outputs. A permanent drive connection between the main speed-change gearbox and the axle drive of the rear axle is created via the rear axle output.

In a first, extreme off-road UNIMOG model, a manually controllable axle engagement clutch in the form of a dog clutch is operatively provided in the transfer gearbox between rear axle output and front axle output, via which axle engagement clutch the axle drive of the front axle can be connected through to the axle drive of the rear axle. A second UNIMOG model, which is designed as an implement carrier, has permanent all-wheel drive and is usually used on paved roads. A longitudinal differential is operatively provided in the transfer gearbox between the rear axle output and the front axle output, in order to compensate for the speed differences between front and rear axles when negotiating tight curves. This longitudinal differential ideally bringing about uniform distribution of the drive torque to the front and rear axles.

In the all-wheel drive, due to the permanent engagement of all the wheels, overloading of the rear axle(s) is in principle avoided, even in difficult traction on an adherent roadway, without depending on the driver. A positive, manually controllable differential lock makes it possible to achieve better traction in this all-wheel drive. In both UNIMOG models, the transverse differentials of the axle drives of front and rear axles can likewise be locked by manually controllable positive differential locks.

The advantages of the UNIMOG model with engageable front wheel axle lie essentially in the specific engagement option with corresponding usage profiles (e.g., tractor or off-road use) and in a "clear drive train state" by deliberate engagement of the front axle and the differential locks of the transverse differentials. The experience gained over several decades with this UNIMOG model has shown that the advantages of this simple and easily comprehensible method of engaging the front axle prevail in most applications.

These many years of experience also show that a foresighted driving technique and estimation of the ground conditions both in easy terrain and especially in difficult terrain have proved to be substantially more effective and reliable than all the hitherto known open-loop and closed-loop control systems. These systems recognize difficult roadway subgrades only when the vehicle has already experienced a loss of speed or a loss of the propulsion, whereas the driver already estimates the situation in advance and, if appropriate, can engage the front wheel drive. However, there is the risk in the case of difficult traction that the rear-axle drive components will be subjected to excessive stress at high adhesion coefficients if the front axle is not engaged due to inattentiveness on the part of the driver.

Independently thereof, German patent document DE 30 34 229 A1 discloses a drive system which is not of the generic type for a motor vehicle (passenger car) with front wheel drive via an automatic gearbox and with a torque converter connected to the crankshaft of the engine of the motor vehicle. The automatic gearbox is connected to the turbine shaft of the torque converter, and has an epicyclic train and a plurality of fluid-medium-actuated devices for producing various operating states. A final reduction gear transmits the power output of the automatic gearbox to the front wheels. In this drive system, a clutch device, containing a fluid-medium-actuated multiplate clutch, is provided for transmitting the power output of the automatic gearbox to the rear wheels.

For changing over to four wheel drive, it is considered to be too complicated to require that the selector lever of the automatic gearbox first be brought into the neutral position in order to be able to actuate a second lever for the engagement of the clutch device for the engagement of the rear axle. It is desirable, therefore, for the front wheel drive to be shifted automatically to the four wheel drive as a function of the drive state.

On the whole, the aim of this drive system is to provide an automatic gearbox having a multiplate clutch operated by pressure oil, with shifting between the front wheel drive and the four wheel drive being executed in accordance with the various drive conditions of the motor vehicle. It is also possible for the multiplate clutch to be actuated as a function of the drive conditions of the vehicle by pressure oil used in the automatic gearbox.

Accordingly, in this drive system, a pressure-oil control device for actuating the flow-medium-actuated devices of the automatic gearbox contains a pressure control valve for producing a line pressure in accordance with the operating state of the engine and a changeover valve for connecting a line for the line pressure to the flow-medium-actuated multiplate clutch. Furthermore, in this drive system, a manual actuating device for actuating the changeover valve is provided in order to apply the line pressure to the flow-medium-actuated multiplate clutch.

European patent document EP 0 076 148 B1 discloses a further drive system which is not of the generic type for a motor vehicle (passenger car), with a front wheel drive and with an engine and a device for controlling the drive torque. A transmission is provided for the effective power transmission from the engine to the front wheels, as well as a friction clutch for the power transmission to the rear wheels and a clutch-actuation device for engaging and disengaging the friction clutch.

In this known drive system, it is assumed that the friction clutch can generally be operated with slip which can be adjusted as a function of the steering angle in order to permit a higher speed of the front wheels passing through a larger curve radius than the rear wheels when negotiating curves. The aim is to be able to set the slip of the friction clutch as a function of further parameters of the drive state, such as the slip of the vehicle wheels. For this purpose, the clutch-actuation device includes a selecting device which optionally permits partial engagement, engagement which is more intense than the partial engagement, or disengagement of the friction clutch. The regulating device has a slip-detection device for detecting the slip of the wheels, a load-detection device for detecting engine load, and a control means which actuates the selecting device as a function of the signals from the slip-detection device and the load-detection device, in such a way that the more intense engagement of the friction clutch is effected during heavy loading and when the wheels are slipping.

Finally, German patent document DE 38 38 709 A1 discloses a further drive system which is not of the generic type for a motor vehicle with automatic changeover from two wheel drive to four wheel drive as a function of slip of the two permanently driven wheels. In this drive system, the disadvantages of a conventional method of detecting a degree of slip of the permanently driven wheels which calls for the four wheel drive are to be avoided. These disadvantages can be seen in the fact that, in the operating state of the four wheel drive, mechanical separation of the engaged wheels from the drive is necessary at time intervals quickly following one another. This requirement is said to be achieved in that the speed difference of the two permanently driven wheels are permanently formed by two sensors assigned to each one of said wheels, with this speed difference being fed to a computer. The latter has stored therein a respective vehicle-specific characteristic speed difference for the two wheel drive and the four wheel drive and compares the fed speed difference as a function of the respective drive state with one of these characteristic speed differences. By means of an actuator connected in series with the computer, the drive can be changed over from two wheel drive to four wheel drive, or vice versa, if the comparison shows that the characteristic speed difference assigned to the two wheel drive is exceeded or that the speed difference is less than the characteristic speed difference assigned to the four wheel drive.

German patent document DE 42 30 326 A1 discloses a drive system for a motor vehicle with automatic changeover from two wheel drive to four wheel drive. This function is active only in an "automatic operating mode", in which the drive is changed over to four wheel drive in the event of excessive slip of the two permanently driven wheels.

U.S. Pat. No. 4,552,036 discloses an automatic gearbox for a motor vehicle which can be changed over automatically from two wheel drive to four wheel drive. Changeover to four wheel drive is effected only when the permanently driven wheels tend to slip.

U.S. Pat. No. 6,347,271 discloses a drive system which is not of the generic type, and in which a changeover from two wheel drive to four wheel drive is effected as a function of an elaborately calculated quotient of throttle valve position and current acceleration of the motor vehicle. The four wheel drive is activated if the quotient exceeds a limit value stored in a control device.

One object of the present invention is to provide a drive system of the generic type for an off-road motor vehicle, in which engagement of the front axle is generally controlled manually by the driver, thereby countering the risk that the rear axle is subjected to excessive stress in the case of difficult traction at high coefficients of friction, and the risk that its service life will be reduced as a result, because the front axle has not been engaged due to inattentiveness on the part of the driver.

This and other objects and advantages are achieved by the drive system according to the invention, which ensures the advantages of the manual engagement of the all-wheel drive by engaging the front axle during off-road use, and avoids excessive stresses of the rear axle(s) which might otherwise occur due to inattentiveness on the part of the driver in the case of a purely manual method of engaging the front axle in the case of difficult traction on an adherent roadway. By avoiding these disadvantages, a permanent all-wheel drive with longitudinal differential can be dispensed with in many applications. This means that, in the previous all-wheel versions with longitudinal differential, the longitudinal differential in the transfer gearbox can be dispensed with.

In the drive system according to the invention, propulsion in normal operation is effected only via the rear axle(s). If greater traction is required, or in the case of roadway surfaces having low coefficients of friction, the front axle is engaged manually by the driver or, with appropriate provision of slip-dependent automatic closed-loop and/or open-loop control systems. Therefore no longitudinal differential is required between front axle and rear axle(s). The driving/mechanical advantages of such a drive system according to the invention with a generally manually engageable front axle consist in the clearly defined operating states of the drive train and of the resulting clearly defined traction and driving behavior.

In the drive system according to the invention, the engagement strategy with regard to the front axle and the differential locks of the axle differentials is formed in two different respects, depending on the drive state and adhesion coefficients. On the one hand, during traction on an adherent roadway with high coefficients of friction, the front axle is automatically engaged as a function of the engine torque, advantageously only above a threshold value of an engine load. The threshold value is advantageously related to a defined fraction of the maximum engine torque and takes into account the instantaneous transmission ratio. Depending on the vehicle type or model, this defined fraction, may lie within a value range of between 60% and 90% of the maximum engine torque and, is preferably about 75%.

In an advantageous embodiment of the drive system the engine load for the effective engagement of the front wheel drive must have exceeded the limit defined by the threshold value for a certain duration, in order to ensure that the engine load involves not only a brief torque peak but also a quasistatic load case (i.e., traction on a gradient).

On the other hand, in construction site operation, in winter service and during off-road use, in order to increase the traction and driving safety with low adhesion coefficients, driver-determined manual engagement and disengagement is provided in steps, with the front axle being engaged in a first step. This drive state is indicated to the driver by illumination of a single warning triangle in an information display.) In a second step, the axle differentials of the rear axles can be locked (i.e., if the motor vehicle is being used in off-road operation and the coefficients of friction are low). In this case, acceptable steerability is still achieved. (This drive state is indicated to the driver by the illumination of two warning triangles in the information display.) Finally, in a third step, the axle differentials of the front axle and of the rear axles can be locked, so that maximum traction is provided. This drive state is selected by the driver if the vehicle is being used in off-road operation, in difficult terrain or on a subgrade covered with mud, and is indicated by the illumination of three warning triangles in the information display.

In the drive system according to the invention, an electronic control unit, in a permanent control state, checks the load-dependent need for automatic engagement of the front axle. This function can be overridden (manually disengaged) at any time by the driver.

If the motor vehicle is in all-wheel operation due to the engaged front axle, an electronic control unit, in a permanent control state, carries out a further requisite check as to whether the operation of a closed-loop and/or open-loop control system influencing the driving state, such as ABS, ADM (automatic drive train management), ESP (electronic stability program) or ESC (engine speed control), is impaired or event prevented by the all-wheel drive. For this case, the control unit automatically disengages the front axle.

For certain vehicle types (for example, fire engines), the slip-dependent (longitudinal and transverse slip) engagement strategies known from the passenger cars and off-road vehicles can be superimposed on the load-dependent engagement strategy for the front axle. In connection with such engagement strategies, German patent document DE 43 27 507 C2 discloses a method for the automatic control of the clutches for activating at least one axle transverse lock and a longitudinal lock or the engagement of the front wheel drive in the drive train of an off-road vehicle with all-wheel drive. Slip signals are formed, based on wheel speed signals, and compared with threshold values to generate control signals for the clutches. In this known method, a separate control module is provided for each individual clutch, and generates control signals for the specific clutch. The control modules of the clutch of the at least one axle transverse lock also deliver control signals for the clutch of the longitudinal lock or for the engagement of the front axle before they activate the specific clutch. The slip signals are slip summation signals which are separately formed by integrating the wheel speed differences assigned to the at least one axle lock, the longitudinal lock or the engagement of the front wheel drive, and are compared with stepped slip summation threshold values. By means of the latter, the sequence and the reaction time of the locking of the locks or of the engagement of the front wheel drive is controlled.

Other objects, advantages and novel features of the present invention will become apparent from the following detailed description of the invention when considered in conjunction with the accompanying drawings.

DETAILED DESCRIPTION OF THE DRAWINGS

Figure 1:
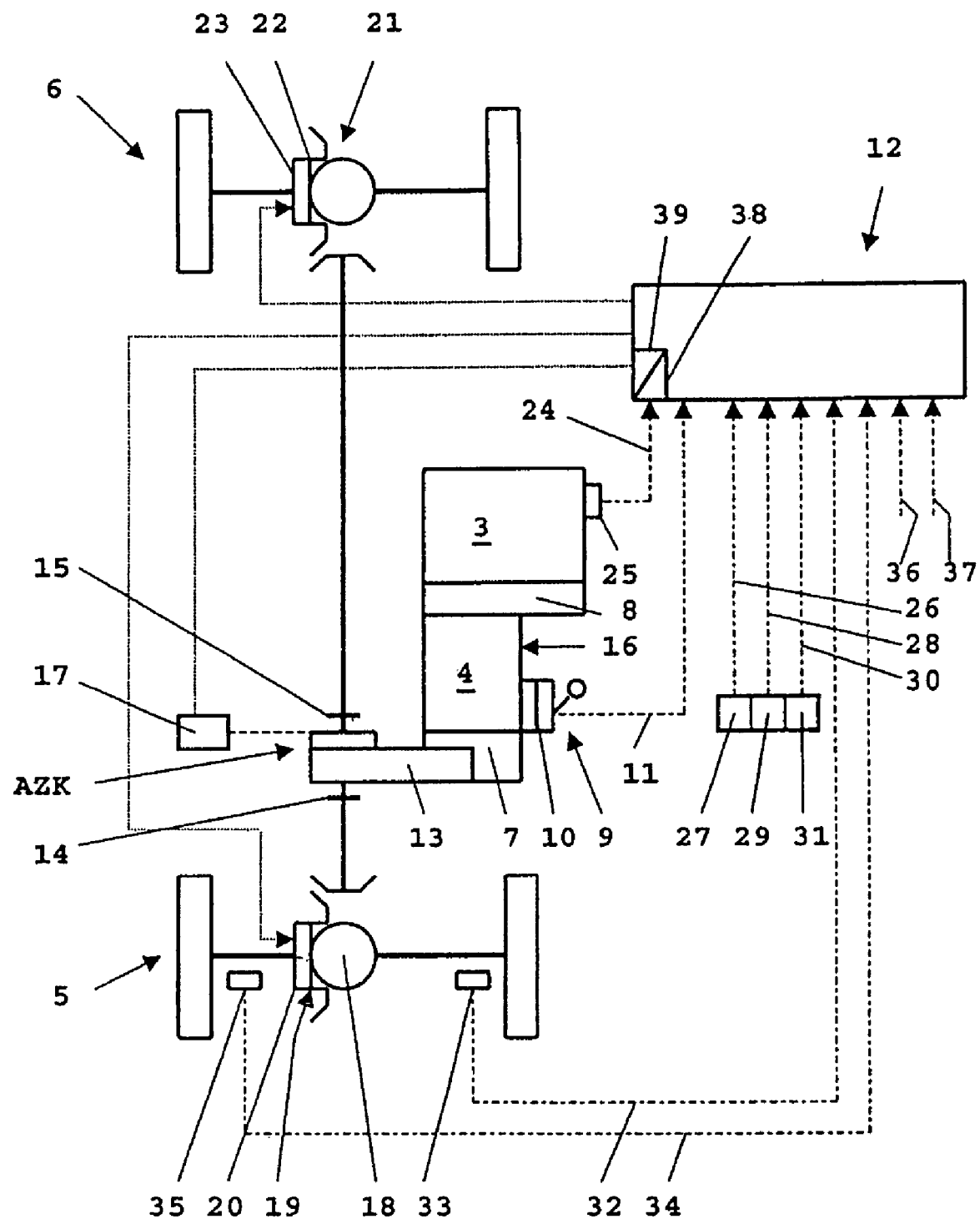
FIG. 1 shows a block diagram of drive system according to the invention.

With reference first of all to FIG. 1, an off-road utility vehicle is driven by a drive engine 3 via a speed-change gearbox 16 which has a four-stage basic gearbox 4, to which a two-stage range-change gearbox 7, (for example in the form of an epicyclic set) is assigned in series in the power flow. The basic gearbox 4 is in drive connection with the drive engine 3 via an external clutch 8. The eight gears of the speed-change gearbox 16 which are obtained by means of the range-change gearbox 7 are selected by a manual selector device 9, if need be with power assistance. The manual selector device 9 has a position sensor 10 which generates a signal 11 for a gear display and a related transmission ratio. The signal 11 is directed as input signal to an electronic control unit 12. The output shaft of the speed-change gearbox 16 is in drive connection with a transfer gearbox 13 which has a gearbox output 14 assigned to a rear axle 5 and a gearbox output 15 assigned to a front axle 6.

The gearbox output 14 is constantly in drive connection with both the output shaft of the speed-change gearbox 16 and an axle differential (transverse differential) 18 of the rear axle 5. The axle differential 18 can be locked by a positive, engaging and disengaging differential lock 19, which can be actuated by a motor-operated locking actuator 20 which can be activated via the control unit 12.

The gearbox output 15 for the front axle 6 is connected to the gearbox output 14 by an engaging and disengaging axle engagement clutch AZK, which is actuated by a motor-operated clutch actuator 17 that can be activated via the control unit 12. Furthermore, the gearbox output 15 is constantly in drive connection with an axle differential (transverse differential) 21 of the front axle 6; the axle differential 21 can be locked by a positive, engaging and disengaging differential lock 22, which can be actuated by a motor-operated locking actuator 23 which can be activated via the control unit 12, in particular in a slip-controlled manner, or by the driver.

The electronic control unit 12 is fed various information specific to the vehicle or vehicle state in the form of input signals, including inter alia an input signal 24, dependent on the instantaneous engine load $M_m$, of a torque-sensing device 25;

the input signal 11, corresponding to the engaged gear of the speed-change gearbox 16, and a relevant transmission ratio $i_G$;

an input signal 26, which can be triggered by the driver by means of a pushbutton 27, for the engagement of the front axle 6 by activation of the axle engagement clutch AZK;

an input signal 28, which can be triggered by the driver by means of a pushbutton 29, for locking the axle differential 18 of the rear axle 5 by activation of the differential lock 19;

an input signal 30, which can be triggered by the driver by means of a pushbutton 1, for locking the axle differential 21 of the front axle 6 by activation of the differential lock 22;

an input signal 32, generated by a speed sensor 33, for the speed of the one rear wheel of the rear axle 5;

an input signal 34, generated by a speed sensor 35, for the speed of the other rear wheel of the rear axle 5;

an input signal 36 indicating the operating state of the ABS; and the operating state of a further closed-loop and/or open-loop control system influencing the driving state, such as ADM (automatic drive train management), ESP (electronic stability program) or ESC (control of the engine speed to a constant speed value).

Finally, as indicated at 38, a threshold value SW for a critical engine load M (based, for example, on an engine torque $M_m$ being equal to about 75% of the maximum engine torque and taking into account the instantaneous transmission ratio $i_G$), and, as indicated at 39, a delay time $T_V$ assigned to the threshold valve SW are filed in the control unit 12. At an engine load M<SW, the automatic load-dependent engagement of the front axle 6 is locked. Automatic load-dependent engagement of the front axle 6 is effected only when an engine load M> threshold value SW is applied, beyond the delay time $T_V$ and overriding manually or by closed-loop and/or open-loop control systems such as ABS or the like which influence the driving state is not effective.

Figure 2:
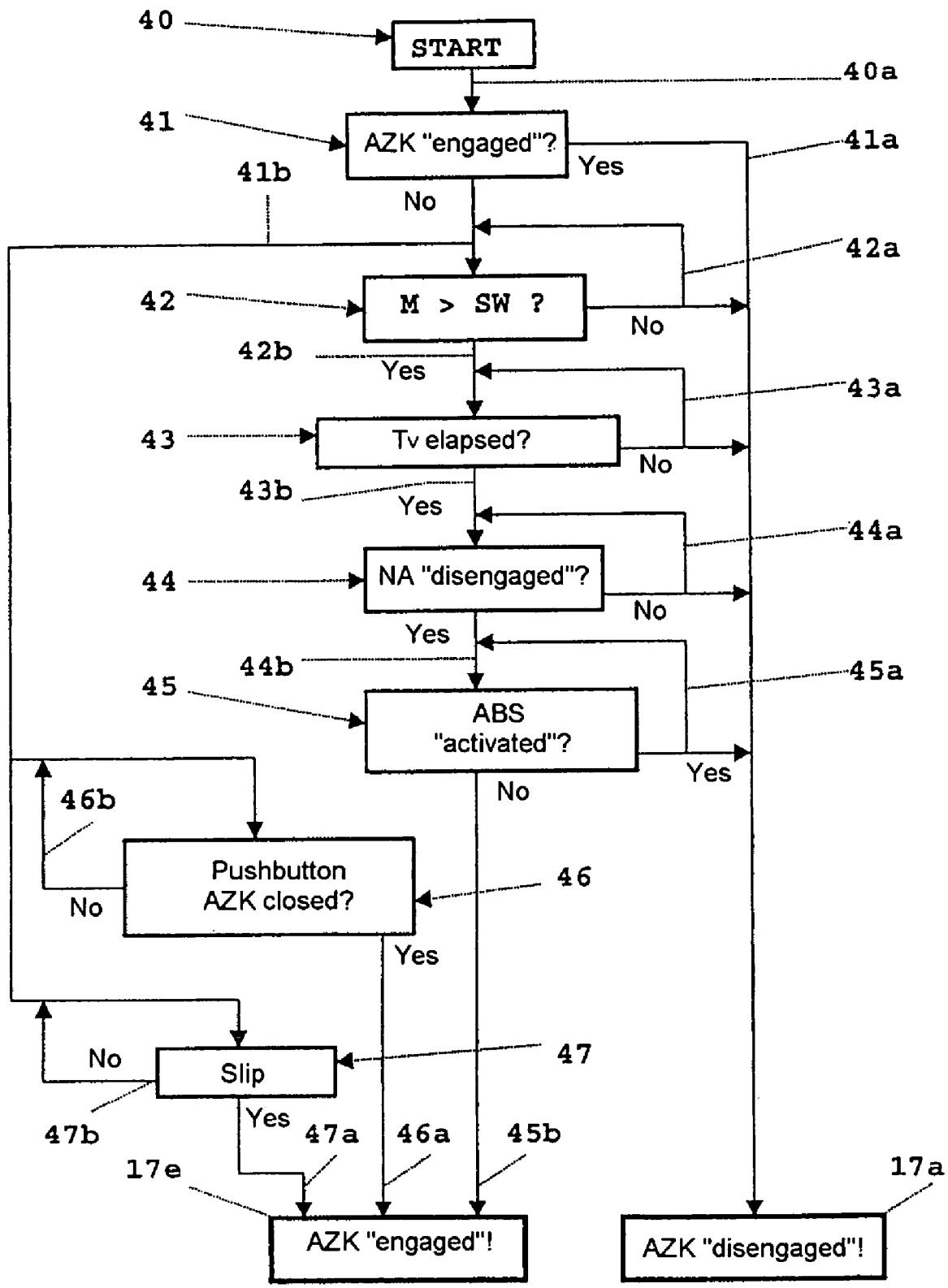
FIG. 2 is a signal flow diagram for controlling the two drive states "rear-axle drive" and "all-wheel drive".

The functioning of the drive system of FIG. 1 is obtained from the signal flow diagram of FIG. 2 as follows:

A starting step 40 is activated, triggering a test step 41 by means of an output signal 40a. The test step 41 establishes whether the front axle 6 is engaged. If so, the test step 41 transmits a disengagement signal 41a to the actuator 17 of the axle engagement clutch AZK, so that the latter is brought into its disengaged position 17a for disengaging the axle engagement clutch AZK. Otherwise, if the front axle 6 is therefore not engaged, the test step 41 switches an output signal 41b to a comparison step 42 and to two test steps 46 and 47.

Triggering the one test step 46 establishes whether the pushbutton 27 is depressed for manual engagement of the front axle 6. If so, the clutch actuator 17 receives an engagement signal 46a from the test step 46, by means of which engagement signal 46a the clutch actuator 17, irrespective of how the further sequence proceeds from the comparison step 42, is brought into its position 17e for the engagement of the front axle 6. Otherwise, by delivery of an output signal 46b, the test step 46 is put into a waiting loop until the next working cycle, which then triggers the test step 46 again.

The triggering of the other test step 47, with reference to the speed signals 32 and 34, establishes whether the rear axle 5 is in the slip state. If so, the clutch actuator 17 receives an engagement signal 47a from the test step 47, by means of which engagement signal 47a the clutch actuator 17, is brought into its position 17e for the engagement of the front axle 6 irrespective of how the further sequence proceeds from the comparison step 42. Otherwise, by delivery of an output signal 47b, the test step 47 is put into a waiting loop until the next working cycle, which then triggers the test step 47 again.

Triggering the comparison step, 42 establishes whether the instantaneous engine load M, which is obtained as $M=M_m \times i_G$ based on the combination of the engine torque $M_m$ and the current transmission ratio $i_G$, is greater than the threshold value SW. If so, the comparison step 42 generates an output signal 42b for triggering a test step 43. Otherwise, the comparison step 42 delivers a disengagement signal 42a for the clutch actuator 17 and for setting a waiting loop, so that the comparison step 42 is triggered again during the next working cycle.

In the test step 43, it is established whether the delay time $T_V$ has elapsed. If so, test step 43 generates an output signal 43b for triggering a further test step 44. Otherwise, the test step 43 delivers a disengagement signal 43a for the clutch actuator 17 and for setting a waiting loop, so that the test step 43 is triggered again during the next working cycle.

In the test step 44, it is established whether auxiliary drives NA or power take-off shafts or the like are in operation. If not, an output signal 44b is generated for triggering a last test step 45. However, if a power take-off shaft, for example, is in operation, the test step 44 delivers a disengagement signal 44a for the clutch actuator 17 and for setting a waiting loop, so that the test step 44 is triggered again during the next working cycle.

In test step 45 it is determined whether the ABS is activated for controlling the brake forces. If not, test step 45 generates an output signal 45b by which the clutch actuator 17 is brought into its position 17e for engaging the AZK, and thus for the engagement of the front axle 6. On the other hand, should the ABS be functioning and regulating the brake forces, the test step 45 delivers a disengagement signal 45a for the clutch actuator 17 and for setting a waiting loop, so that the test step 45 is triggered again during the next working cycle.

The priority control steps required for the abovementioned overriding of the functions "engagement" and "disengagement" with regard to the front axle by the driver or by closed-loop and open-loop control systems specific to the vehicle are not shown, for the sake of simplicity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A drive system for an off-road utility vehicle having at least one rear axle, which can be permanently driven by a drive engine via a speed-change gearbox, and a front axle, which is operatively connected to the rear axle by an axle engagement clutch that is controllable manually for engagement and disengagement; wherein, engagement of the axle engagement clutch can also be initiated automatically as a function of the engine load; and automatic engagement of the axle engagement clutch is blocked at an engine load less than a threshold value which is related to a defined fraction of the maximum engine torque of the drive engine.

2. The drive system according to claim 1, wherein the defined fraction lies within a value range of between 60% and 90% of the maximum engine torque of the drive engine.

3. The drive system according to claim 2, wherein the defined fraction is approximately 75% of the maximum engine torque of the drive engine.

4. The drive system according to claim 1, wherein automatic engagement of the axle engagement clutch is blocked during a predetermined time interval starting from the point at which the threshold value is reached.

5. The drive system according to claim 4, wherein automatic engagement of the axle engagement clutch can be overridden manually.

6. The drive system according to claim 5, wherein automatic engagement of the axle engagement clutch can be overridden as a function of one of a closed-loop and an open-loop control system influencing the driving state.

7. The drive system according to claim 6, wherein engagement of the axle engagement clutch can be also automatically initiated by a parameter which depends on the slip state of the rear axle of the utility vehicle.

* * * * *